(12) United States Patent
Kim

(10) Patent No.: US 8,664,782 B1
(45) Date of Patent: Mar. 4, 2014

(54) ELECTRIC GENERATOR APPARATUS FOR MOTOR VEHICLES

(71) Applicant: Johnny Kim, Garfield, NJ (US)

(72) Inventor: Johnny Kim, Garfield, NJ (US)

( * ) Notice: Subject to any disclaimer, the term of this patent is extended or adjusted under 35 U.S.C. 154(b) by 0 days.

(21) Appl. No.: 13/839,667

(22) Filed: Mar. 15, 2013

(51) Int. Cl.
*F02B 63/04* (2006.01)
*F03G 7/08* (2006.01)

(52) U.S. Cl.
USPC .............................. 290/1 R; 290/44; 290/55

(58) Field of Classification Search
None
See application file for complete search history.

(56) References Cited

U.S. PATENT DOCUMENTS

| | | | |
|---|---|---|---|
| 3,621,930 A | 11/1971 | Dutchak | |
| 3,713,503 A | 1/1973 | Haan | |
| 3,878,913 A | 4/1975 | Lionts et al. | |
| 4,075,545 A | 2/1978 | Haberer | |
| 4,168,759 A | 9/1979 | Hull et al. | |
| 4,254,843 A | 3/1981 | Han et al. | |
| 5,917,304 A | 6/1999 | Bird | |
| 6,138,781 A * | 10/2000 | Hakala | 180/2.2 |
| 6,373,145 B1 | 4/2002 | Hamrick | |
| 6,857,492 B1 | 2/2005 | Liskey et al. | |
| 7,665,554 B1 | 2/2010 | Walsh | |
| 7,810,589 B2 | 10/2010 | Frierman | |
| 2008/0020875 A1* | 1/2008 | Serrels et al. | 474/70 |
| 2009/0301796 A1* | 12/2009 | Wedderburn et al. | 180/2.2 |

* cited by examiner

*Primary Examiner* — Tulsidas C Patel
*Assistant Examiner* — Thomas Quigley
(74) *Attorney, Agent, or Firm* — Greenberg Traurig, LLP

(57) ABSTRACT

A system for generating electricity for powering an electric or hybrid motor vehicle uses a fan which is driven by the air flow created by the motion of the vehicle. In the event that the fan is unable to generate sufficient electricity, a controller operates an auxiliary gas powered motor for the generation of electricity for powering the electric or hybrid motor vehicle.

18 Claims, 3 Drawing Sheets

ELECTRIC GENERATOR APPARATUS FOR MOTOR VEHICLES

FIELD OF THE INVENTION

The present invention relates to an electric generator apparatus and, more particularly, to a wind driven electric generator apparatus for motor vehicles.

BACKGROUND OF THE INVENTION

Significant technological efforts are being devoted on decreasing the dependence on fossil fuel for powering electric and hybrid motor vehicles through the application of "green" or natural resources. For example, electric and hybrid motor vehicles have been proposed that use the air flow created by the forward motion of the electric or hybrid motor vehicles for the generation of electricity. However, such systems are typically complex and/or inefficient.

SUMMARY OF THE INVENTION

In accordance with one embodiment of the invention, an apparatus for generating electricity for a motor vehicle includes a rotary member that is rotatably mounted in a passageway of a motor vehicle so as to be rotated by an airflow moving through the passageway. The rotary member is connected to a generator so as to drive the generator for producing electricity for charging a battery in the motor vehicle. A motor is also connected to the generator for driving the generator. A controller is connected to the motor and is configured to monitor the rotational speed of the rotary member for selectively activating the motor to drive the generator when the rotational speed of the rotary member is below a predetermined threshold level.

Another embodiment of the invention provides a method for generating electricity for a motor vehicle. The method involves the steps of rotating a rotary member connected to a generator for generating electricity in response to movement of the motor vehicle, monitoring the rotational speed of the rotary member, and activating a motor for driving the generator when the rotational speed of the rotary member is below a predetermined threshold level.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE EXEMPLARY EMBODIMENT

Although the present invention can be used in conjunction with any type of motor vehicle, it is particularly suitable for use in connection with an electric or hybrid automobile. Accordingly, the present invention will be described hereinafter in connection with an electric or hybrid automobile. It should be understood, however, that the following description is only meant to be illustrative of the present invention and is not meant to limit the scope of the present invention, which has applicability to other types of motor vehicles such as boats, trains, etc.

Figure 1:
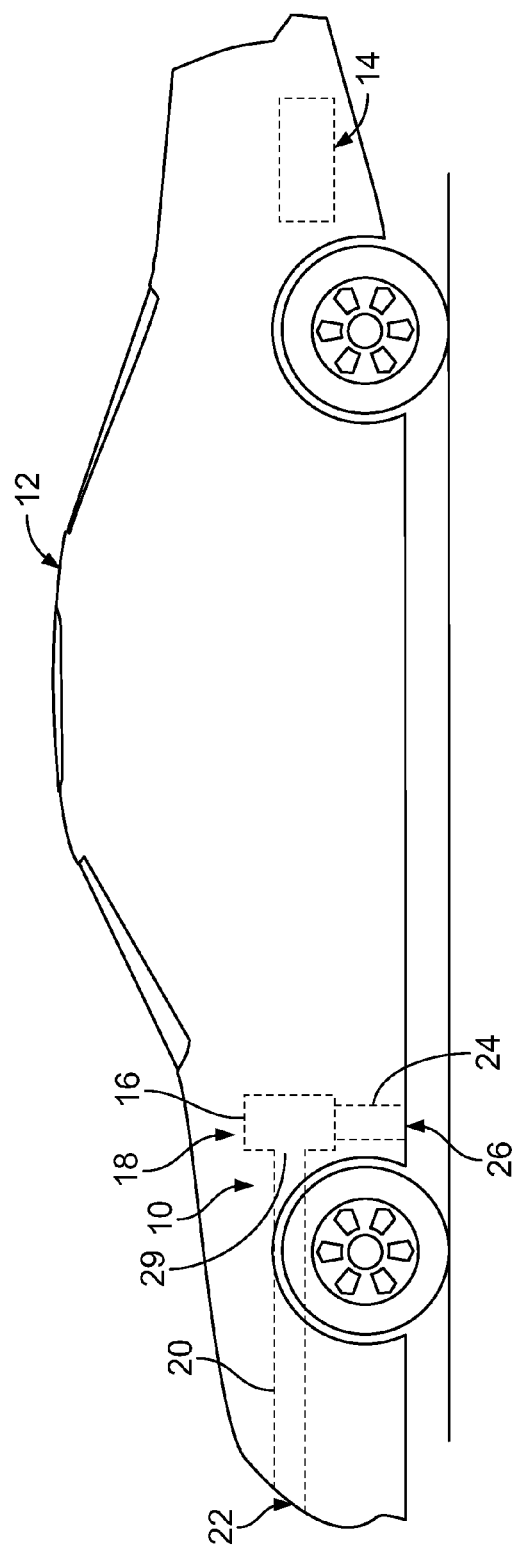
FIG. 1 is a schematic view of an automobile which is equipped with a wind driven electric generator apparatus constructed in accordance with an embodiment of the present invention.

FIG. 1 illustrates an electric generator apparatus or system ("the system 10") which is positioned in an electric or hybrid automobile 12. In one embodiment, storage batteries 14 are provided to store electricity generated by the system 10 and are connected to a drive mechanism (not shown) to drive the automobile 12. The system 10 has a housing 16 which is mounted in a forward engine compartment 18 of the automobile 12. An intake air flow duct 20, which has an air intake 22, is mounted on the front of the automobile 12. The duct 20 conveys air flow, which is produced by the forward motion of the automobile 12, through the housing 16 of the system 10. An exhaust air flow duct 24, which has an air exhaust 26, conveys air flow away from the housing 16 and away from the engine compartment 18. The air flow ducts 20, 24, are sized and shaped to convey air flow to and from the system 10 with minimum aerodynamic flow losses. It is understood that the system 10 may be located in another location of the automobile 12, such as a rear or a roof compartment, if the system 10 can be supported by ducts that do not produce excessive aerodynamic flow losses. The system 10 may have an air flow duct arrangement that is similar to the duct arrangements disclosed in, for example, U.S. Pat. Nos. 4,2544,843, 6,373,145 B1 and 6,857,492 B1, the disclosures of which are incorporated herein by reference in their entirety.

Figure 2:
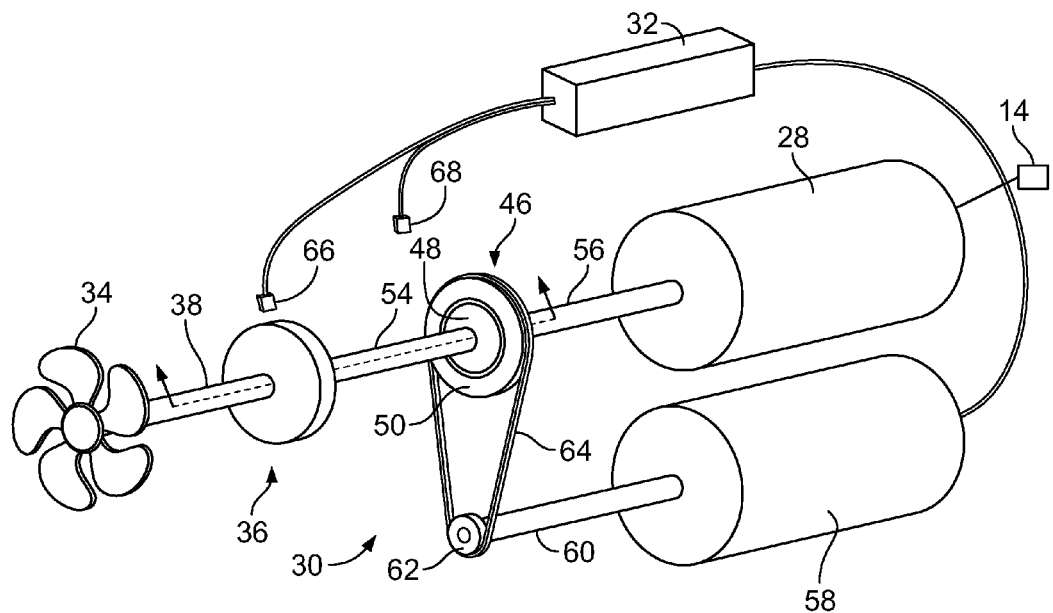
FIG. 2 is a perspective schematic view of the wind driven electric generator apparatus of the automobile shown in FIG. 1.
Figure 3:
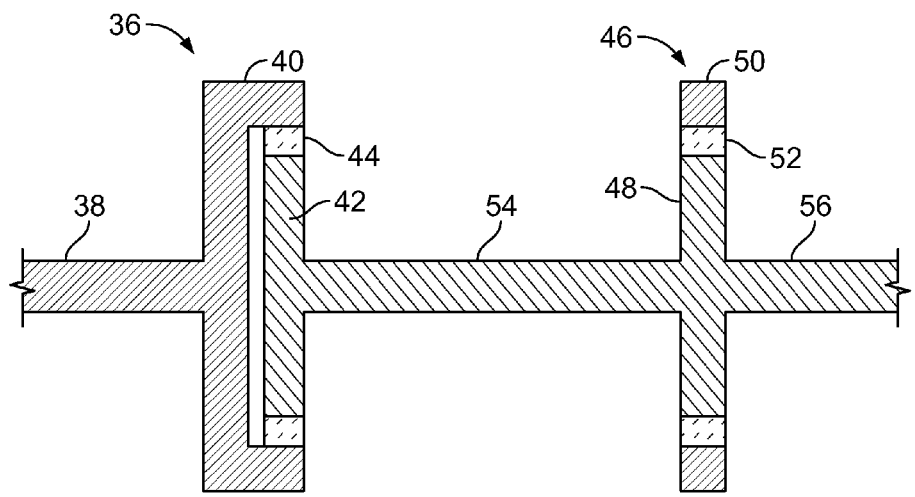
FIG. 3 is a cross-sectional view, taken along section line 3-3 and looking in the direction of the arrows, of the apparatus shown in FIG. 2.

FIGS. 2 and 3 illustrate the components of the system 10 that are housed in the housing 16. The system 10 includes a generator 28, a drive mechanism 30 for driving the generator 28 and a controller 32 for controlling the operation of the driving mechanism 30. More particularly, the drive mechanism 30 is equipped with a turbine or fan 34 located proximate to an entrance point 29 (see FIG. 1) where the airflow duct 20 enters the housing 16. The fan 34 is rotatably mounted so that it is free to rotate as a result of the flow of air passing thereby, which is produced by the movement of the automobile 12. The flow of air is supplied to the housing 16 by the duct 20, and is exhausted from the housing 16 through the duct 24.

Still referring to FIGS. 2 and 3, the drive mechanism 30 includes a fan clutch 36 and a shaft 38, which connects the fan 34 to the fan clutch 36. More particularly, the clutch 36 has a driving ring plate 40, a driven plate 42 and a ratchet ring 44 interposed between the driving plate 40 and the driven plate 42. The shaft 38 is fixedly attached to the fan 34 and the driving plate 40 such that the drive plate 40 can rotate conjointly with the fan 34. The ratchet ring 44, which is similar, in construction and operation, to conventional freewheel ratchet rings (e.g., a freewheel ratchet mechanism used in the rear wheel of a bicycle, such as DICTA BRAND freewheels sold by Lida Co., located in Taiwan), allows the driven plate 42 to be rotatably driven by the driving plate 40, while allowing the driven plate 42 to rotate at a speed faster than that of the driving plate 40. As a result, the driven plate 42 may rotate faster than the drive plate 40 without affecting the speed or operation of the driving plate 40 and hence the fan 34 (e.g., the driven plate 42 may rotate while the driving plate 40 and the fan 34 remain stationary).

The drive mechanism 30 also includes a motor clutch 46 connected coaxially to the fan clutch 36. The motor clutch 46 is equipped with a motor driven member or plate 48, a driving ring 50 and a ratchet ring 52 interposed between the driving ring 50 and the driven plate 48. The ratchet ring 52, which is similar, in construction and operation, to conventional freewheel ratchet rings (e.g., a freewheel ratchet mechanism used in the rear wheel of a bicycle, such as DICTA BRAND freewheels sold by Lida Co., located in Taiwan), allows the driven plate 48 to be rotatably driven by the driving ring 50, while allowing the driven plate 48 to rotate at a speed faster than that of the driving ring 50. As a result, the driven plate 48 may rotate faster than the driving ring 50 without affecting the speed or operation of the driving ring 50 (e.g., the driven plate 48 may rotate while the driving ring 50 remains stationary).

The drive mechanism 30 is also provided with a shaft 54, which is attached to the driven plate 42 and the driven plate 48, and a shaft 56, which is attached to the driven plate 48 such that the driven plates 42, 48 and the shafts 54, 56 are rotatable conjointly with each other. The shaft 56 is connected to the generator 28 for driving same to generate electricity. As a result, the driven plates 42, 48 and the shafts 54, 56 form the drive shaft of the generator 28.

A motor 58 (e.g., an auxiliary gas-powered motor) is provided in the housing 16 for selectively rotating the driving ring 50 of the clutch 46 (see FIGS. 2 and 3). More particularly, the motor 58 has a drive shaft 60 and a pulley 62 fastened to the shaft 60. A chain or belt 64 is provided for connecting the pulley 62 to the driving ring 50 of the clutch 46 such that the driving ring 50 and hence the driven plate 48 can be selectively rotated by the operation of the motor 58 for the purpose of driving the generator 42, as will be discussed in greater detail below. The motor 58 can be powered by an auxiliary onboard gas-powered generator or other suitable mechanisms.

Referring to FIG. 2, the controller 32 includes a sensor 66, which is located adjacent the driving plate 40 of the clutch 36, and a sensor 68, which is located adjacent the driving ring 50 of the clutch 46. The sensor 66 is adapted to measure the rotational speed of the driving plate 40 and hence the fan 34 and send corresponding electrical signals to the controller 32. Similarly, the sensor 68 is adapted to measure the rotational speed of the driving plate 50 and hence the motor 58 when the motor 58 is in operation and send corresponding electrical signals to the controller 32. In this regard, the driving plate 40 and the driving ring 50 may be provided with mechanisms (e.g., markings, gear teeth, etc.) thereon or at alternate locations (e.g., on the shafts 38, 56) for allowing the sensors 66, 68, respectively, to monitor their rotational speeds.

In operation, the forward motion of the motor vehicle 12 produces a flow of air into the air intake 22 of the duct 20 The duct 20 conveys the air flow through the entrance point 29 of the housing 16, where the air flows aerodynamically over the fan 34. In response, the fan 34 rotates to drive the driving plate 40 of the clutch 36, which in turn causes the driven plate 42 at the rotational speed of the fan 34. Since the driven plate 42 is connected to the shaft 56 via the shaft 54 and the driving plate 48 of the clutch 46, the rotation of the driven plate 42 (cased by the fan 34) drives the generator 28 for the production of electricity for charging the batteries 14.

Figure 4:
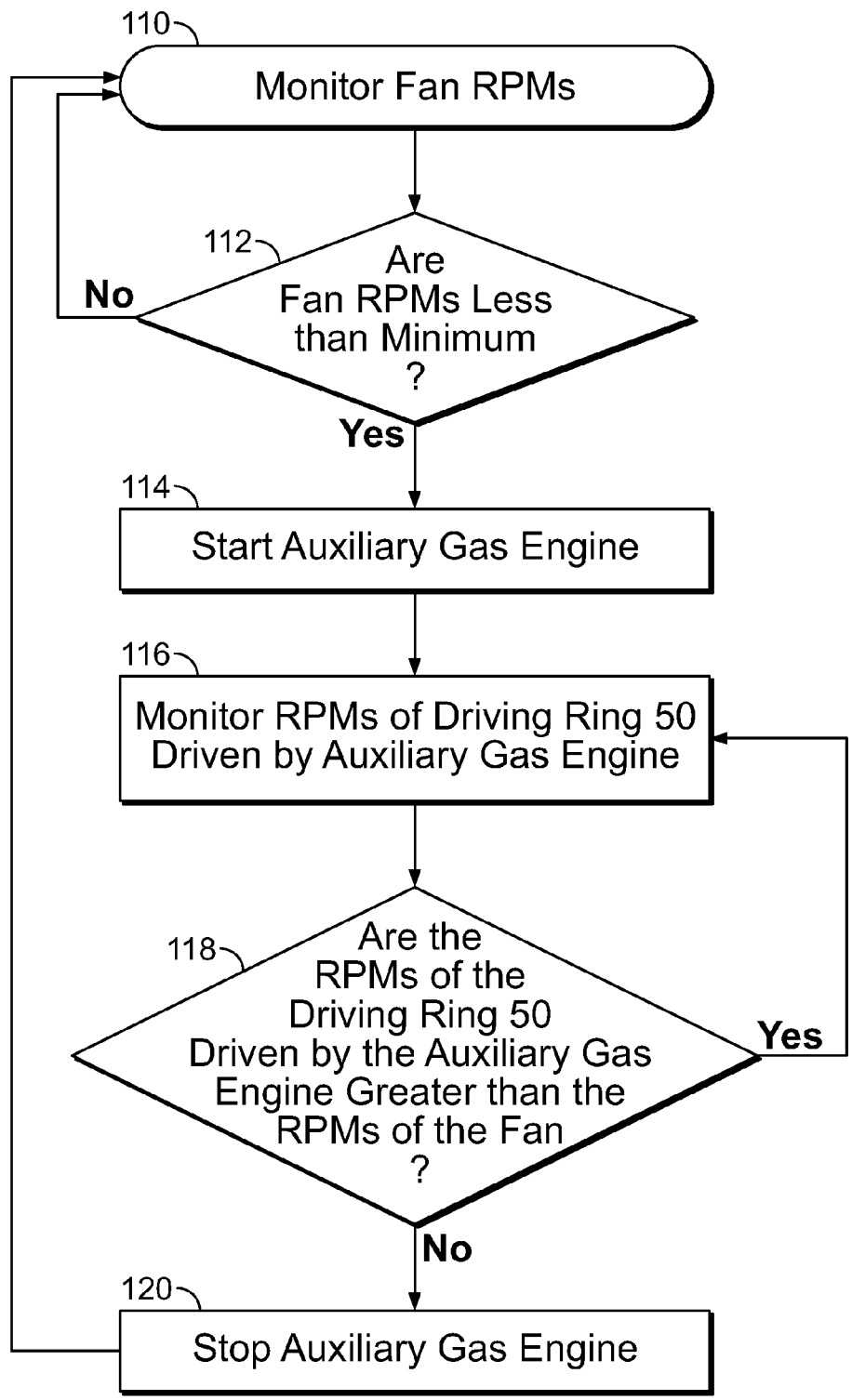
FIG. 4 is a flow diagram illustrating a control process associated with the apparatus shown in FIG. 2.

Now referring to FIG. 4, the controller 32 monitors the rotational speed of the fan 34 via the sensor 66 (see block 110). More particularly, the controller 32 receives data supplied by the sensor 66 and converts same into a measurement of the rotational speed of the fan 34. If the rotational speed of the fan 34 is determined to be equal to or greater than a predetermined minimum threshold level (e.g., a rotational speed too slow for sufficiently charging the batteries 14) (see block 112), the controller 32 continues its fan-speed monitoring activity (see block 110). On the other hand, if the rotational speed of the fan 34 is determined to be less than the threshold level (i.e., the fan 34 rotates too slowly) (see block 112), then the controller 32 activates the motor 58 (see block 114), which in turn causes the driving ring 50 of the clutch 46 to rotate. The driving ring 50 in turn rotates the driven plate 48 so as to drive the generator 42 for the production of electricity for charging the batteries 14. Due to the provision of the ratchet ring 44 in the clutch 36, the driven plate 48 and hence the driven plate 42 may rotate at a speed greater than that of the fan 34 without affecting the motion of the fan 34.

With the motor 58 running at step 114, the controller 32 monitors the rotational speed of the driving ring 50 via the sensor 68 (see block 116 in FIG. 4). If the rotational speed of the driving ring 50 is measured to be greater than the rotational speed of the fan 34 (see block 118), then the controller 32 continues the operation of the motor 58 and its monitoring activity (block 116). On the other hand, if the rotational speed of the driving ring 50 is less than the rotational speed of the fan 34 (e.g., the fan 34 rotates at a speed sufficient to charge the batteries 14), the controller 32 then stops the operation of the motor 58 (see block 120), thereby permitting the fan 34 to drive the generator 42. Due to the provision of the ratchet ring 52 in the clutch 46, the driving ring 50 may remain stationary, while the driven plate 48 is rotated by the fan 34.

In one embodiment, the operation of the drive mechanism 30 may be controlled by the controller 32 by monitoring the rotational speed of the fan 34 only. More particularly, while the motor 58 is running to drive the generator 28, if the rotational speed of the fan 34 monitored by the controller 32 exceeds a predetermined speed (e.g., the pre-calculated rotational speed of the motor 58), the motor 58 can be turned off such that the generator 28 can be driven by the fan 34. Likewise, when the rotational speed of the fan 34 is below a predetermined speed, the controller 32 activates the motor 58.

In another embodiment, the operation of the drive mechanism 30 can be controlled by the controller 32 without actively monitoring the rotational speed of the fan 34 or the driving ring 50. For instance, the controller 32 can be configured to receive data corresponding to the speed of the automobile 12, which can be used by the controller 32 to calculate the approximate rotational speed of the fan 34. Using the calculated data, the controller 32 can activate and deactivate the motor 58. In yet another embodiment, an independent speed monitoring mechanism can be provided on the automobile 12 for supplying speed information to the controller 32.

In other embodiments, the clutches 36, 46 may be replaced with other mechanical or electro-mechanical mechanisms for transferring motion from a driving member to a driven member while allowing the driven member to rotate at a speed greater than that of the driving member. Moreover, the shaft 54 may be eliminated so as to position the driven plate 42 side-by-side with the driven plate 48 or to integrate the driven plates 42, 48 into a single unitary element.

It is understood that one or more embodiments of the present invention may be implemented with one or more computer readable media, wherein each medium may be configured to include thereon data or computer executable instructions for manipulating elements of the controller 32, as described below. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including general purpose computers, special purpose computers, application-specific integrated circuit (ASIC), and digital/analog circuits with discrete components and other comparing devices, for example.

It should be appreciated that the present invention provides numerous advantages. For instance, the system 10 uses the air flow produced by the motion of the motor vehicle 12 to produce electricity, thereby reducing dependence on the operation of the auxiliary gas motor 58. When the speed of the motor vehicle 12 is not sufficient to charge the batteries 14, the motor 58 may be activated to supplement the electrical power necessary to operate the motor vehicle 12.

It should be noted that the present invention can have numerous modifications and variations. More particularly, the controller 32 may be programmed with alternate control-modes. For instance, a control-mode may be provided that responds to an abnormal automobile operating condition, such as stop-and-go city traffic, in which the controller 32 minimizes unnecessary on and off cycling of the motor 58.

It will be understood that the embodiment described herein is merely exemplary and that a person skilled in the art may make many variations and modifications without departing from the spirit and scope of the invention. All such variations and modifications, including those disclosed hereinabove, are intended to be included within the scope of the invention, as defined by the appended claims.

I claim:

1. Apparatus for generating electricity for a motor vehicle, comprising:
   a generator for generating electricity;
   a rotary member rotatably mounted in a passageway of the motor vehicle so as to be rotated by an airflow moving through the passageway;
   a motor;
   a drive mechanism connected to said generator for driving said generator and including first and second clutch units which are connected to each other coaxially, said rotary member being coupled to one of said first and second clutch units, said motor being coupled to the other one of said first and second clutch units, said first and second clutch units being configured such that said generator can be driven by said rotary member while said motor remains stationary and such that said generator can be driven by said motor while said rotary member remains stationary; and
   a controller connected to said motor, said controller being configured to monitor the rotational speed of said rotary member for selectively activating said motor to drive said generator when the rotational speed of said rotary member is below a predetermined threshold level.

2. The apparatus of claim 1, wherein said drive mechanism is connected to said rotary member so as to drive said generator in response to the rotation of said rotary member.

3. The apparatus of claim 2, wherein said drive mechanism is connected to said motor so as to drive said generator in response to the activation of said motor.

4. The apparatus of claim 3, wherein said drive mechanism is configured such that the operation of said motor drives said generator without driving said rotary member.

5. The apparatus of claim 4, wherein said drive mechanism is configured such that the rotation of said rotary member drives said generator without driving said motor.

6. The apparatus of claim 1, wherein said one of said first and second clutch units includes a first driving member, a first driven member and a first ratchet member interposed between said first driving member and said first driven member.

7. The apparatus of claim 6, wherein said first driving member is connected to said rotary member and said first driven member is connected to said generator.

8. The apparatus of claim 7, wherein said other one of said first and second clutch units includes a second driving member, a second driven member and a second ratchet member interposed between said second driving member and said second driven member, said second driving member being connected to said motor, and said second driven member being connected to said generator.

9. The apparatus of claim 1, wherein said controller includes a first sensor for monitoring the rotational speed of said rotary member.

10. The apparatus of claim 9, wherein said controller is configured to terminate the operation of said motor when the rotational speed of said rotary member is not below said predetermined threshold level.

11. The apparatus of claim 9, wherein said controller includes a second sensor for monitoring the rotational speed of said motor; and wherein said controller is configured to terminate the operation of said motor when the rotational speed of said motor is not greater than the rotational speed of said rotary member.

12. The apparatus of claim 1, wherein said rotary member includes a fan.

13. A method of using an apparatus having a generator for generating electricity, a rotary member rotatably mounted in a passageway so as to be rotated by an airflow moving through the passageway, a motor, and a drive mechanism connected to the generator for driving the generator and including first and second clutch units which are connected to each other coaxially, the rotary member being coupled to one of the first and second clutch units the motor being coupled to the other one of the first and second clutch units, the first and second clutch units being configured such that the generator can be driven by the rotary member while the motor remains stationary and such that the generator can be driven by the motor while the rotary member remains stationary, comprising the steps of:
   rotating the rotary member so as to cause the generator to generate electricity in response to an airflow moving through the passageway;
   determining a rotational speed of the rotary member; and
   activating the motor for driving the generator when the rotational speed of the rotary member is below a predetermined threshold level.

14. The method of claim 13, wherein said rotating step is performed without driving the motor.

15. The method of claim 14, wherein the operation of the motor drives the generator without driving the rotary member.

16. The method of claim 13, further comprising the step of deactivating the motor when the rotational speed of the rotary member is not below the predetermined threshold level.

17. The method of claim 16, wherein said determining step is performed by sensing the rotational speed of the rotary member.

18. The method of claim 13, further comprising the steps of monitoring the rotational speed of the motor; comparing the rotational speed of the rotary member to the rotational speed of the motor; and deactivating the motor if the rotational speed of the motor is not greater than the rotational speed of the rotary member.

* * * * *